UNITED STATES PATENT OFFICE.

C. EDWARD HECHT, OF EASTON, AND WALTER S. DAVIS, OF READING, PA.

CALCIMINE.

SPECIFICATION forming part of Letters Patent No. 254,647, dated March 7, 1882.

Application filed August 2, 1881. (No specimens.)

*To all whom it may concern:*

Be it known that we, C. EDWARD HECHT, of Easton, in the county of Northampton, and WALTER S. DAVIS, of Reading, in the county of Berks, both in the State of Pennsylvania, have invented certain new and useful Improvements in Preparing Calcimines; and we do hereby declare the following to be a full, clear, and exact description of the invention, such as will enable others skilled in the art to which it appertains to make and use the same.

Hitherto glue has generally been used as the binding material for distemper colors, which must be prepared only as fast as needed. The objections to this are, first, the impossibility of cleaning the colored surface of any spots or soil that may mar the beauty or cleanliness of the coating; second, the danger and annoyance arising from the dust which constantly falls or is brushed off and floats in the atmosphere and adheres to the clothing; third, the difficulty and annoyance incident to the necessity of mixing or dissolving the dry material to the proper consistence; fourth, the greater trouble in spreading it on the walls, and in the fact that it requires the skilled labor of a number of persons to prevent the laps in the line of joinder of the successive applications from showing; fifth, the necessity of having a binding coat between the first and second coats, thus requiring one-third more time, labor, and expense; sixth, the utter impossibility of keeping the wet mixed or prepared material, owing to the rapid putrefaction of glue when dissolved in water; seventh, the liability, as ordinarily prepared by the old process, of the pigments and coloring materials separating by settling to the bottom. It is our object to obviate all these difficulties by furnishing a washable calcimine mixed ready for immediate use.

The process of manufacture is as follows: One hundred pounds of pure oxide of zinc or other white or a colored pigment is mixed with two gallons of linseed-oil and ground in a burr mill as fine as possible. To this is added just enough solution of caustic soda of 35° Baumé strength to make a stiff mass. A saponified mixture of rosin and glue is then made as follows: Eighty-seven and one-half pounds of rosin and sixty-five and three-quarters pounds of soda (carbonate) are mingled together in fifty-six gallons of rain-water. When thoroughly combined sixty-six and seven-eighths pounds of glue are added and stirred carefully until the whole forms a homogeneous mass. Venice turpentine or its equivalent—Burgundy pitch—may be substituted for rosin. This compound is designated "compound A." A second compound (B) is formed as follows: Twelve and three-quarters pounds each of white wax and white soap are mingled in fifty-one and three-eighths gallons of rain-water, and before removal from the fire thirty-four and one-quarter pounds of glue are added and stirred until dissolved. These compounds are mixed in the proportions of one part of compound A to three parts of compound B, and of this mixture four gallons are added to the stiff mass of zinc or other pigment above described, and thoroughly mixed and allowed to stand five or six days, or until the combination is perfect. Then is added gradually and carefully one gallon of a cream of fresh lime slaked with hot water. (Some colors require more and some less than this.) After standing until the ingredients have reacted the whole is passed through a burr mill. When quite cold it is ready for use.

Our calcimine compound possesses the following characteristics or advantages: First, any spots or soil may be washed off with water, and any ordinary injury may be repaired; second, it forms a perfect and beautiful coating on wood or plastered walls that will not, under any ordinary brushing or sweeping, crack, peel, or dust off; third, it is in a liquid state and ready for immediate application; fourth, it works freely and smoothly under the brush, so that unskilled hands can use it without the showing of laps on the line of joinder of the successive applications; fifth, it does not require any coat of binding material in order to apply additional coats; sixth, it will keep pure and sweet for an indefinite length of time, and is therefore in a commercial form; seventh, the peculiarity of our compound, when prepared with oxide of zinc, which we prefer, is such that no separation of the coloring-matter or pigments will occur by their settling to the bottom.

We find it adapted for fresco-painting and to the coating of card-board, paper, wood, and a variety of uses. With it combinations almost indefinite may be formed in paints, cements, and fillers for woods, so that its value to artisans, at its comparatively trifling cost, will be as great as to the unskilled laborer.

We do not limit our claims to the exact proportions herein stated.

Having described our invention, we claim and desire to secure by Letters Patent—

1. A water-proof calcimine ready mixed for application, composed of pure zinc oxide or other pigment, linseed-oil, caustic soda, rosin, soda-carbonate, water, glue, wax, soap, and lime, mixed together substantially as specified.

2. The process of compounding a water-proof liquid calcimine, consisting of the following steps: first, mixing zinc oxide or other pigment and linseed-oil with a solution of caustic soda to form a stiff mass; second, adding to said mass a compound mixture composed of a compound (A) of rosin, glue, and soda-carbonate mixed in rain-water, and a compound (B) of white wax, white soap, and glue, also mixed in rain-water; and, third, adding to the whole a cream of fresh lime slaked in hot water, all in about the proportions specified, substantially as described.

In testimony whereof we affix our signatures in presence of two witnesses.

C. EDW. HECHT.
    WALTER S. DAVIS.

Witnesses to the signature of Hecht:
 STEWART M. HOHL,
 GEO. FINLEY.

Witnesses to the signature of Davis:
 HARRY W. KNIGHT,
 EUGENE SNYDER.